United States Patent [19]

Etani

[11] Patent Number: 4,512,955
[45] Date of Patent: Apr. 23, 1985

[54] APPARATUS FOR WATER TREATMENT

[76] Inventor: Kenji Etani, P.O. Box 188, West Townsend, Mass. 01474

[21] Appl. No.: 349,920

[22] Filed: Feb. 18, 1982

Related U.S. Application Data

[63] Continuation-in-part of Ser. No. 40,302, Apr. 18, 1979, abandoned, which is a continuation-in-part of Ser. No. 934,425, Aug. 17, 1978, abandoned, which is a continuation of Ser. No. 717,514, Aug. 25, 1976, abandoned, which is a continuation-in-part of Ser. No. 591,536, Jun. 30, 1975, abandoned.

[51] Int. Cl.³ .............................................. B05B 7/24
[52] U.S. Cl. .................................. 422/266; 137/268; 239/310
[58] Field of Search ............................... 422/264–266; 210/62, 169, 51, 59, 633, 749, 765; 4/222, 228; 222/167, 168.5, 169; 137/268; 239/55, 59, 57, 58, 310–318, 266; 34/60; 209/5

[56] References Cited

U.S. PATENT DOCUMENTS

| | | | |
|---|---|---|---|
| 2,543,075 | 2/1951 | Swain | 239/567 |
| 2,826,484 | 3/1958 | Buehler | 422/265 |
| 3,120,015 | 2/1964 | MacChesney | 239/266 |
| 3,633,538 | 1/1972 | Hoeflin | 206/0.5 |
| 3,677,408 | 7/1972 | Dinizo | 210/169 |

Primary Examiner—Hiram H. Bernstein
Attorney, Agent, or Firm—Gilbert L. Wells; Jack Larsen

[57] ABSTRACT

A new use of the apparatus for dispensing chemicals such as insecticides and fertilizers by means of a garden hose is disclosed. In earlier applications the use of a spherical feeder capsule in an "intermediate-velocity chamber" was disclosed wherein the spherical shape provided uniformity of feeding by reason of its random movement and rotation in the chamber. In the new use described, the spherical shape may provide a decidedly non-uniform rate of feeding; and there may be a lesser degree of freedom of the feeder within the chamber compared to the earlier-claimed uses. In the preferred embodiment a water supply is connected through a hose to a chamber such as the "Fluidic Lawn Feeder" produced by Acme Burgess Inc. From the chamber a second piece of hose extends to a pistol-grip nozzle of the well-known type whereby an operator may quickly turn the water on and off to the pro-set rate of spray or the like. When the water is suddenly shut off by this kind of nozzle it tends to create a "water hamer" in the chamber so that users are expressly warned against use of such nozzles with the "Lawn Feeder" as supplied by Acme Burgess Inc. A new use is shown for a spherical feeder capsule with small feed holes which tends both to damp and limit the "water hammer" as an air bubble in the capsule is compressed, on resuming flow, the trapped air expands and positively ejects an amount of the concentrated solution from the feeder capsule into the flow. Thus in steady flow, a small and relatively constant rate of feeding is established, as shown in earlier-filed application; but an operator can by every pull of the trigger on the nozzle provide a "shot" of more concentrated solution.

10 Claims, 10 Drawing Figures

APPARATUS FOR WATER TREATMENT

This application is a continuation-in part of my now abandoned application Ser. No. 040,302, filed 4-18-79 which is a continuation-in part of application Ser. 934,425, filed Aug. 17, 1978 and now abandoned, which was a continuation of application Ser. 717,514, filed Aug. 25, 1976 and now abandoned, which was a continuation-in-part of the ancestor application Ser. 591,536, filed June 30, 1975 and now abandoned.

This invention relates to water quality and more particularly to new methods and apparatus for feeding controlled amounts of chemicals such as detergents, insecticides, herbicides, nutrients, and the like to water being applied by a garden hose and nozzle.

U.S. Pat. Nos. 2,543,075 to Friedrich and 3,120,015 to MacChesney disclose prior art methods of feeding chemicals by interposing a chamber in a hose line. FIGS. 8,9, and 10 of pending application Ser. 040,302 show an arrangement of an "intermediate-velocity chamber" with a substantially spherical feeder holding a chemical, interposed in a hose line to a lawn sprinkler. Recently, Acme Burgess Inc. of Gray's Lake, Ill. has widely advertised on television a "Lawn Feeder" which also embodies a feeder within a chamber interposed in a line of garden hose.

The present invention is a result of my attempts to adapt the chamber sold by Acme Burgess to function as an "intermediate-velocity chamber" in the practice of my previously-disclosed inventions. To this end I purchased a "Lawn Feeder" chamber and then noticed in the user directions supplied with it a warning that it should not be used with the hand-held nozzle. I then set about some test to understand why this warning was included; and to determine whether a modification of the system might permit the use of such a nozzle.

The "Lawn Feeder" chamber is equipped with an automatic float valve to bleed out any air which might otherwise accumulate in the chamber. With no air in the chamber, the pressure within the chamber rises to very high value when the outflow is abruptly cut off as with a pistol-grip nozzle. This pressure may well crack the plastic container resulting in an undesirable, and possibly dangerous spill of the chemical contained therein.

Never-the-less I tried out the system using a dye within one of my spherical feeders. The color of the effluent gave a quick and approximate measure of the rate of chemical feeding. I noticed that the arrangement did produce a relatively constant flow rate such as had been the objective in my earlier invention; but I also noticed that with each activation of the trigger, a spurt of heavily-colored water emerged. By squeezing the trigger several times, I could cause a large outflow of the dye compared to the steady-flow condition. Additionally, and importantly, I noticed that the air that was trapped within my spherical feeder, in combination with the flexibility of the feeder, effectively protected the chamber from the water-hammer effect.

Accordingly, it is an object of the invention to provide means and a method to feed water treatment chemicals by way of a garden hose which gives the user the option of a slow and steady rate of feeding or a rate of feeding that is remotely controllable by actuating the nozzle or other rapid cut-off device. It is also an object of the invention to provide and improvement in lawn feeding systems whereby a closed feeding chamber is protected from water-hammering by the use of a substantially spherical thin-shelled feeding capsule.

BRIEF DESCRIPTION OF THE DRAWING

Other objects and features of the invention will in part be obvious, and in part apprehended from the following specification and annexed drawings of which:

FIG. 1, illustrative of a water treatment system from which the present invention evolved, represents a typical swimming-pool system for the home, as more fully described in my above-mentioned earlier-filed patent applications. A pool 10, has a drain 11 and sump 12. A skimmer 14, which carries away overflow, a strainer 15 is at the inlet of the circulating pump 16. A filter 17, a main 18 source of fresh water, outlet 19, pool inlet 20, pipes 21–30, and valves 31–36 connect and complete the system as shown.

Figure 1:
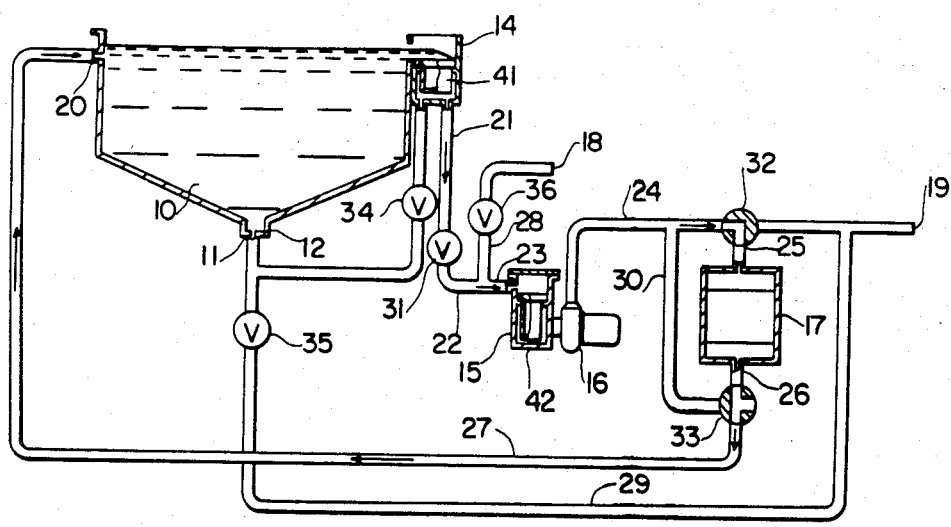
FIG. 1 is a schematic diagram of a swimming-pool system typical of my earlier described uses of the feeders of the present invention.

In normal operation, the water in the system recirculates passing through both the skimmer basket 41 and the strainer 15 in each circulation. The velocity of the water is relatively high in the pipes 21, 24, and 27, relatively low in the pool 10 and has an "intermediate velocity" as it passes through the skimmer 14 and strainer 15. In the nomenclature of the invention, these are "intermediate-velocity chambers".

Water treatment is effected by inserting a feeder capsule such as shown in FIGS. 2–5 into one of these "intermediate-velocity chambers".

The "feeder" is a compact container resistant to attack by water and by the treatment chemical to be used and perforated by a number and size of small holes to provide the desired rate of feeding. The feeder must be small enough in relationship to the size of the chamber so as not substantially to restrict the flow and to be free to turn and move about its contents, and to average out any feed-rate dependence on a position or attitude within the chamber.

Figure 2:
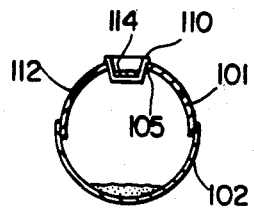
FIGS. 2,3, and 4 are alternative constructions of the feeder capsule used in the invention.

In the construction of FIG. 2, plastic hemispheres 101 and 102 are cemented together with a lap joint as with some table-tennis balls. The fill hole 105 is closed by a plug 110 which is rendered buoyant by a foam filler 114.

Figure 3:
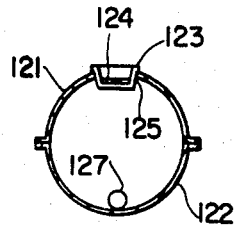

In the construction of FIG. 3, the hemispheres 121 and 122 are flanged and the flanges cemented together. A fill hole 125 is closed by a plug 123 with a floatation body 124 in the same manner as in FIG. 2. To further favor the plug-up orientation, the capsule is loaded with a weight 127 such as a lead shot.

Figure 4:
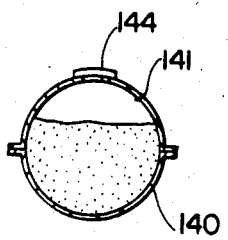

FIG. 4 shows an alternative arrangement wherein the capsule is permanently sealed by means of a patch 144.

Sometimes the chemical to be dispensed is loaded into the capsule as solid body which dissolves in the water which enters the capsule through the small holes. In this case the solution inside of the capsule remains substantially saturated with the chemical so long as any of the body remains; and the feed rate is constant so long as any of the solid remains. It is convenient to load the chemical into one hemisphere and seal the other to it using a flanged seam as in FIG. 4.

Figure 5:
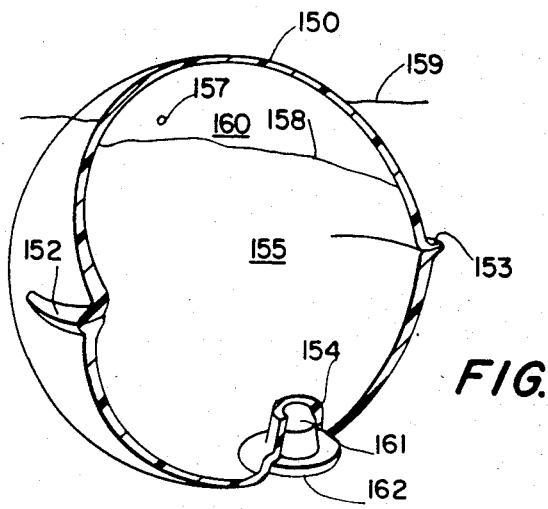
FIG. 5 is a cut-away view of the preferred embodiment of the feeder capsule of the invention.

FIG. 5 is a cut-away drawing of the capsule configuration preferred for most other cases. The sphere is blow molded of high-density polyethylene. Twenty-two grams of the polymer are needed for a sphere 2¾ inches in diameter. The shell 150 varies somewhat in thickness between about one sixteenth and one eighth of an inch. The mold is made in two parts. When molding is complete the sphere is left with, a pair of stub wings 152 and 153 which serve the functions of the flange in the configuration of FIG. 3, and a dimple which is subsequently cleanly cut through to form the filling hole 154.

Figure 6:
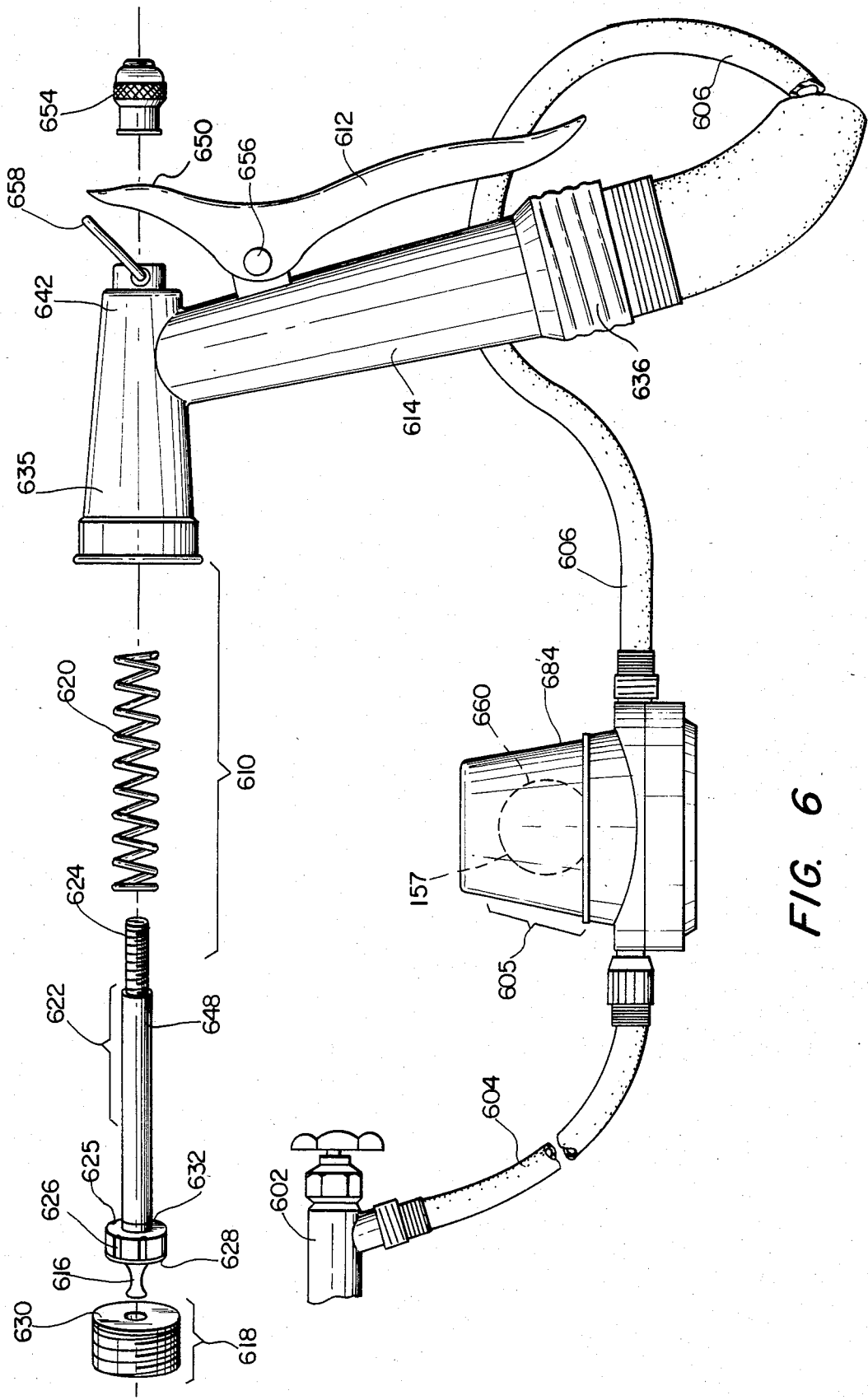
FIG. 6 is a schematic diagram of an embodiment of the system of the present invention with an exploded view of a water nozzle as employed in the system.
Figure 7:
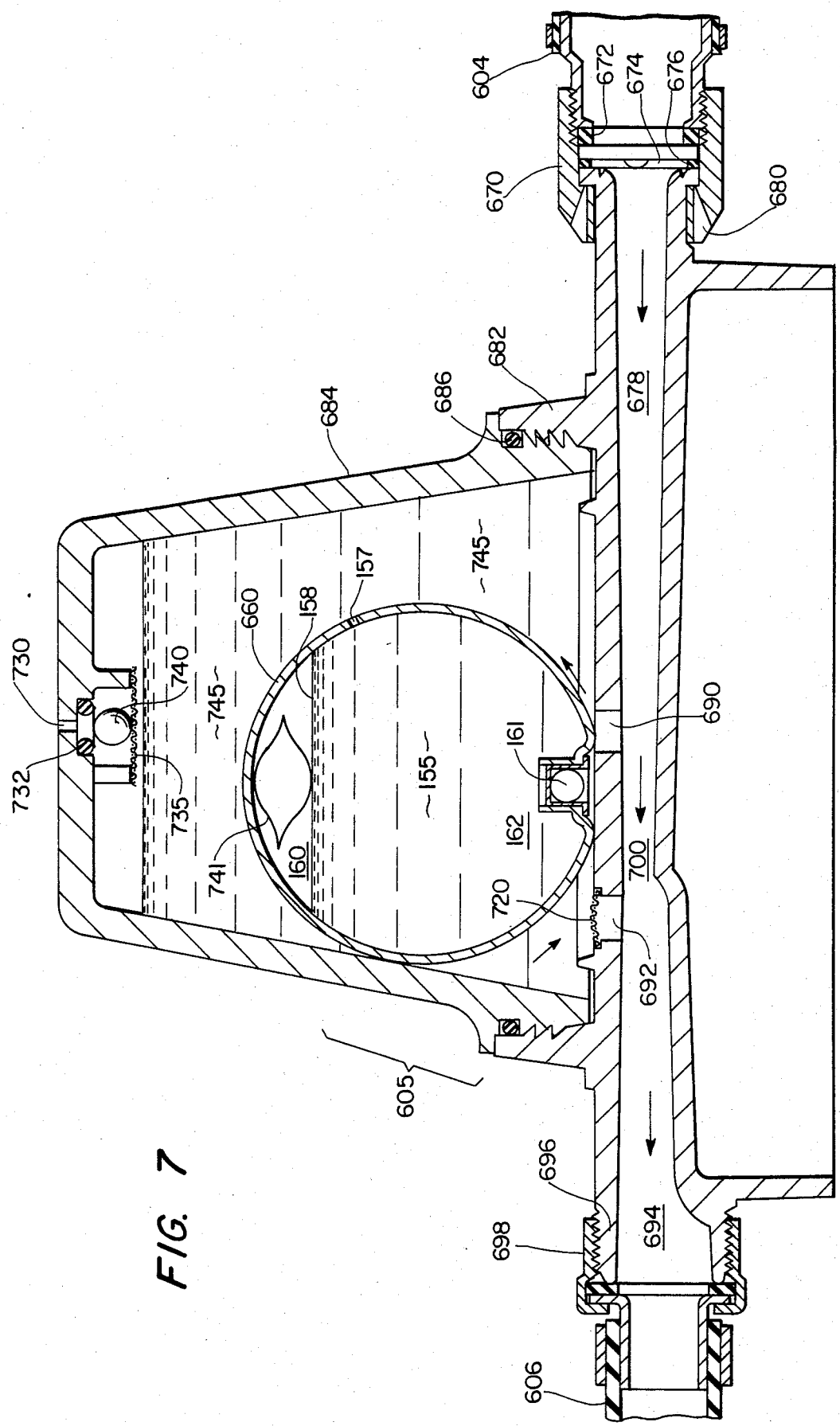
FIG. 7 is a sectional view of the intermediate velocity chamber of system of FIG. 6.

FIG. 5 represents the capsule as filled with insecticide 155 for use in the system of FIGS. 6 and 7. It is desired that this capsule rest in a position with each dispensing hole 157 near the liquid level at 158 inside the capsule and at 159 outside when the capsule is in repose in still water. To achieve this result and for the further advantages described below, an air space 160 is left after filling with the solution, and a zero-guage lead buck shot 161 is swaged into the filler plug 162.

FIG. 6 is a drawing representative of a system for applying insecticide both specifically and generally as needed in a typical garden. From a water supply sillcock 602 a section of garden hose 604 extends to an intermediate-velocity chamber 605. A second section 606 of garden hose connects the chamber 605 to a pistol-grip water nozzle 610. The nozzle may be any one of several manufacturers all of which are adapted to turn the water "on" and "off" rapidly by operation of a lever 612 on the grip 614 which pulls the valve needle 616 away from its seat 618 against the pressure of the water and of a spring 620.

The construction illustrated is that for the nozzle sold by the Gilmour Manufacturing Co. of Somerset, Pa. 15501. Similar nozzles are available from other manufacturers.

The valve has a brass stem 622 which has a contoured needle 616 at one end and a screw thread 624 at the other end. An elastomeric body 624 is molded to the stem next to the needle which provides the valve face 626 with sealing lip 628 which seats against an elastomeric washer 630 on the seat 618. The body 625 has four radially extending legs 632 which center the stem 622 and slide against the bore of the barrel 635. Water enters the bore by way of a female connector 636 and channel (not shown) through the grip 614. The bore is closed at the rear by a bushing portion 642 which closely fits the cylindrical portion 648 of the stem 622. There is no provision for stem packing on this model. The spring 620 engages the body 625 and the bushing portion 642 and holds the valve normally closed.

The valve stem 622 passes through a slot (not shown) at the end 650 of the lever 612 and is retained in the slot by a knurreled nut 654. The lever 612 is pivoted at 656 to the rear of the grip 614 so that as the grip 614 and the lever 612 are squeezed together, the fork pulls against the nut 654, which draws the valve stem 622 rearward, thereby lifting the face 626 from the seat, opening the valve.

As the valve opens, the contoured needle 616 alters the strength and nature of the projected stream of spray. A clip 658 is hinged to the bushing portion 642, so that the valve may not seat when the lever is released, but be held open by an amount that is adjustable by the nut 654. Thus the nozzle can be quickly and conveniently opened to a pre-determined setting, or to the full-on condition, and quickly shut off.

FIG. 7 is a larger and more-detailed drawing showing in cross section the intermediate-velocity chamber 605 and a dispensing capsule 660 adapted for the practice of the invention.

The capsule may be of the construction shown in FIG. 5. Because of the shot 161 which weights down the filler plug 162, the feeder is somewhat constrained as it moves randomly about within the chamber. Because it does have substantial symmetry about the vertical axis, the dispensing hole 157 does face in random directions relative to the direction of water flow within the chamber. Accordingly the arrangement achieves for steady-state flow relatively constant flow rate on the average which is a feature of the embodiments disclosed in my above-mentioned patent applications.

The chamber 605 is shown as manufactured by Acme Burgess Inc. Water from the hose section 604 of hose is connected to a female coupling ring 670 which contains an elastomeric washer 672, and a valve washer 674 which normally presses against the seat 676, being held there by the water pressure. When the pressure within the input channel 678 becomes greater than or substantially equal to the pressure in the hose section 604, the valve washer unseats, dumping the contents of the section 604 and the channel 678 through vents 680. The chamber 610 comprises a base 682 of a suitable moulded plastic composition, a transparent jar 684 is adapted to thread onto the base 682, and sealed by an "O"-ring 686.

The jar, which is about 3.5 inches in diameter and 3.5 inches high provides adequate space so that a feeder as shown 2.75 inches in diameter is free to move about and turn within the chamber without substantially restricting the flow of water through the chamber.

Water enters the jar through a port 690 from the channel 678 and leaves by a port 692 into an exit channel 694 which attaches to the hose section 606 by the male and female couplings 696 and 698, respectively of the usual kind.

There is between the input channel 678 and the exit channel 694 a venturi section 700 to create the pressure differential to push the water through the jar. The outlet port 692 is located near the edge of the base, so that the spherical capsule cannot block it. It is also protected by a screen 720.

The relief valve washer 674 provides a safety function that is essential in the use for which the chamber was designed by Acme Burgess. The tub-shaped feeder capsule in their system substantially fills the jar, and water freely enters it through relatively large holes. In consequence, if the chamber were not drained immediately after the supply water is shut off at the sill-cock 602, there would soon accumulate a potentially saturated solution of treatment chemical in the jar 684 and the hose section 606. As will be seen below, this danger is avoided by the construction of capsules as shown in FIG. 5; but back-flow control provides additional safety and is not harmful to the use of the present invention.

Because the jar 684 is emptied automatically, there must be means to vent the air out of it when the water supply is restored.

At the top of the jar is a vent hole 730 sealed to an "O"-ring 732. Below the "O"-ring a screen 735 retains a spherical float 740, which appears to be a polyethylene sphere. Until the water 745 rises to the top of the jar as shown in FIG. 7, about to raise the float 740 to engage the "O"-ring 732, air freely leaves through the vent hole 730.

In the chambers as presently sold by Acme Burgess, the size of the venturi section 700 and of the ports 690 and 692 are each fixed and constant and determined by the design of the mold that produces the base 682. It may be desireable to make the size of one or more of these channels adjustable for use by professionals; but as a safety feature to prevent excessive feed rates because of possible maladjustment, the fixed configuration may be preferable for the general public.

The feeder capsule 660 or "feeder" is initially filled with a liquid 742 or a liquid over an undissolved solid, (not shown) leaving a volume 160 of air over the liquid. A small number of small holes 157, usually only one or two, are pierced through the shell near the air-solution interface 158. Because of capillarity, and the small size of the holes, there will generally be no flow of either air or of the solution through these holes in the absence of a pressure differential.

It might appear that reliable feeding would not be achieved with but a single dispensing hole 157. This notion would not fully appreciate the function of the air space 160 and of the dynamics of the flow. With a single hole, water is moving in and out as the local pressure is greater or less than the pressure in the air space 160.

The air space has been found to provide a second mode of operation for the apparatus of FIGS. 6 and 7. In the first, or "steady-state" mode, the motion of the capsule within the chamber provides a low, but constant, rate of feeding of the chemical that is proportional to the flow rate of the water.

To assure that the effective volume of the air space does not fall below a safe minimum, a small gas bladder 741 may be enclosed. The bladder may be formed flat by sealing off sections of thin polyethylene tubing to enclose a small quantity of a material such as ammonium bicarbonate ($NH_4HCO_3$), which decomposes to inflate the bladder after, rolled up, it is inserted into the feeder.

Operation of the water nozzle 610 so as rapidly to increase or decrease the rate of flow introduces a "transcient" mode of operation. For example, with a mains supply pressure of 70 p.s.i. (pounds per square inch) in steady flow, because of resistance in the hose section 604, the cock 602, and the piping (not shown), the steady-state flow condition may result in a pressure of only 35 p.s.i. within the chamber 610. When the steady flow is abruptly shut off by releasing the lever 612, the pressure within the chamber 610 surges to a much higher value, e.g. 120 p.s.i. But for the presence of the capsule 660 and the entrapped air 160, the pressure would reach a much higher peak value, and exert a so-called "water-hammer" blow which might burst the chamber. The pressure then quickly drops to the main pressure of 70 p.s.i. The dynamics of the system are very complex, depending upon the sizes and construction of the hoses sections; but the thin wall of the capsule 660 will collapse under any excess pressure before failure of the stronger and thicker walls of the chamber 605. When the chamber pressure settles down to the main pressure, the pressure of the entrapped air 160 (and/or bladder 741) is brought to the main pressure by outflow of water through the feed hole 157. The volume of air is then about half or the steady state value. When normal flow is restored, a further volume of concentrated solution is immediately expelled through the feed hole 157.

In the arrangement as illustrated, actual size, the volume of the air 160 at atmospheric pressure is roughly one cubic inch. At main pressure it is reduced to about 1/5 cubic inch, which volume substantially doubles with normal flow. Thus each shot with the "pistol" delivers about 1/5 cubic inch of concentrate. At this rate there are about fifty "shots" per capsule.

Figure 9:
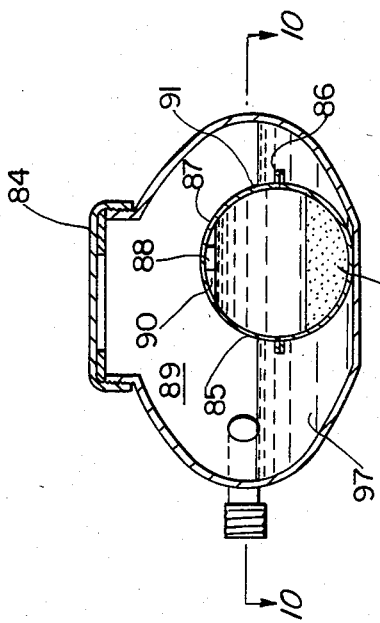
FIGS. 9 and 10 are sectional views of the chamber of FIG. 8.
Figure 10:
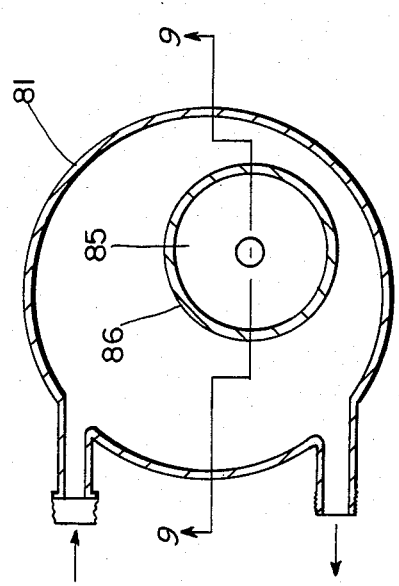

I found the arrangement as shown in FIGS. 6 and 7 effective in treating an infestation by Gypsy moth caterpillars. The insecticide used was Bacillus Thuringiencis Berliner in an 0.8% solution as supplied by the Tuco Division of Upjohn, having a potency of 4000 international units per milligram.

A single feed hole 0.026 inches in diameter was situated 30 degrees from the pole. Approximately 150 milliliters of solution are required to fill the capsule up to that level. A zero-gauge lead buckshot was wedged into the filler plug as shown.

FIG. 8 illustrates another embodiment of the invention. Water from a garden hose 80 is directed through an alternative intermediate-velocity mixing chamber 81 and on to the nozzle 610. As shown in FIG. 9 the chamber 81 has a screw top 84, and contains a water-treatment feeder capsule 85 also shown in FIG. 10 with room enough to roll around in the chamber as the water runs.

The capsule 85 is made of two hemispheres, preferably fastened together by ultrasonic welding forming a flange 86. One hemisphere is provided with a dimple 87. The bottom of this dimple is thinned because of the nature of the vacuum forming process used to produce the hemispheres. A feed hole 88 is conveniently pierced at that point. A dry chemical is introduced into the capsule before the halves are welded together preferably by bricketting the chemical to fit the lower hemisphere. This makes the capsule relatively childproof prior to use. After water 97 enters the container, the chemical nearest to the pierced dimple 87 dissolves first and three layers are formed within the capsule, i.e., the pocket 90 of entrapped air around the recess, the chemical solution 91 in the middle, and the yet-undissolved solid chemical 92 on the bottom. When the water is turned off and there is no flow through the chamber 81, the capsule is in repose with the lighter dimpled side upward and the heavier solid chemical side down. Chemical feeding into the system except by diffusion is virtually stopped. When the water is turned on the capsule rolls with the current and the solution is released through the feed hole or holes and rapidly mixes with the water to the nozzle. The yet-undissolved chemical remains in the bottom of the capsule. In this case it may sometimes be desired to release chemical at a rate so great that the solution 91 becomes substantially less than saturated. The feed rate then becomes dependent upon the exposed area of the chemical. Fortunately the stability is greatest when the area is greatest, and least when the area is least, so that the feed rate tends to remain constant, even though saturation is not complete.

The chamber may be provided with back-siphonage, back-flow preventer (not shown) such as Watts No. 8 (made by Watts Regulator Co., Lawrence, Mass. U.S. Pat. No. 3,171,423) to maintain the water inside at a certain level as illustrated in FIG. 9 for a prolonged period of time after the flow has stopped. The feeding is stopped completely since the feed hole is above the liquid level inside and outside the capsule.

Because feeding stops when flow stops, it may not be necessary to have back flow control.

An automatic air vent is not needed when there is no automatic dumping. At start up, the air can be bled by loosening the lid 84.

This system exhibits the same tow modes of operation as the construction of FIGS. 6 and 7. It may be filled with a brickette of garden chemicals such as fungicides, herbicides, insecticedes, wetting agents, and micronutrients such as chelated iron, manganese, copper, and zinc. The lead shot may be added as required. For some chemicals a feed hole size as large as 0.2% of the feeder surface may be appropriate. In a typical case, the gardener would use the pistol nozzle to make spot applications of chemical, then with the nozzle held open by the clip 658 or with a separate sprinkler or other distribution device, use up the remaining chemical in area application.

In the prior art it is known to place a fluid-treatment chemical in a container with holes small enough to keep a solid chemical inside, while allowing the fluid to pass through freely. Examples are the common tea bag, the spherical capsule and system shown in U.S. Pat. No. 2,543,075, and the plastic capsule of U.S. Pat. No. 3,633,538. It is also known for various kinds of feeders to float around in a swimming pool to dispense chlorine from solid chemical. U.S. Pat. No. 2,826,484 to Buehler is an example as is Canadian Pat. No. 612268 to MacMahon. MacMahon discloses a structure wherein there are two relatively small holes into the dispensing capsule, one at the bottom from which saturated solution feeds out driven by its increased density. The Buehler patent contemplates a similar mechanism, and suggests a substantial total area of dispensing holes, as is required for chlorine.

U.S. Pat. No. 2,543,075 to Friedrich and No. 3,120,015 to MacChesney disclose methods of feeding chemical by interposing a chamber in a hose line.

Only in the Patent to MacMahon is the size of the feed holes important. The smallest port diameter tested by MacMahon was two millimeters.

The present invention in all its embodiments involves a dispensing capsule that feeds chemical from one or more relatively small holes. In the steady-flow condition, the rate of feeding at any instant depends upon the directions the feed holes are pointing relative to the directions of the surrounding flow and of gravity. The angles between these directions change as the feeders are used. Because of the construction of the feeder and the place of application in the system, and the random changing of the directions, a new result is created, an average rate of feeding which remains constant although the instantaneous rate varies as the feeder moves and turns, which averaging is a new result not found in prior art.

In the transient condition the amount of chemical fed with each pressure cycle is seen to depend upon the volume of air space 160 and on the pressure and pressure variation in each transient.

Provided the shell of the capsule is sufficiently stiff and and elastic and provided that the feed hole or holes do not have to much resistance to flow in and out with pressure variation, the rate of feeding in the transient condition is relatively independent of the size and number of feed holes.

Thus the user may choose to have feeding in one mode greater or less than feeding in the other. Using a single small feed hole, as in the example, causes feeding in the transient condition to predominate. With two or three holes selected to have the same resistance as the single hole; steady-state feeding is substantially increased, while transient performance is unchanged.

Although substantially spherical feeders are shown and that shape is preferred for the capsules, and the spherical shape has advantages in shipping and handling contributing to the practical value of the invention, there can be a departure from spherical without leaving the scope of the invention. Egg shape, might be good, indeed, the bird's egg, with porous shell and countless tiny holes is part of the prior art. In theory and in function, some chemical will be dispensed whatever the size of the capsules, or the size of the holes; but this invention relates more to useful arts than to science. The invention derives its value, not from "gee whiz?" performance; but from simple, practical, economical, and safe solutions to water-treatment problems. Because the structures are known and simple, and the chemicals are employed for known effects, there is the possibility that language broad and general enough to define the invention in all its embodiments would also read on totally unrelated processes on a scale larger or smaller which do not teach this art and are presently unknown to me. I have, therefore, determined practical limits on the size of the feeder capsules, and practical operable ranges for the hydrodynamics of the several systems as a basis for the appended claims. It is not suggested that these limits are critical or absolute, or that the invention would be inoperable outside of these ranges. The limits are based upon present and foreseen costs and available technology. In general the capsules are a handy size and of compact formation, having holes for feeding which are small, but not mere pores and large enough to provide a desired rate of feeding. The proper size for a capsule and the number, size, and situation of feed holes for a particular use will readily be ascertained by experiment. The range of sizes contemplated by the physicist and engineer from Angstrom to parsec clearly outstrips the lexicographer's ability to find words for all of the degrees of "large" and "small". Accordingly, in the claims, I have done what engineers and scientists must do, I have used numbers to more clearly and definitely define the invention. However, from the nature of the invention, it will be understood that these numbers are not critical, and express only my understanding of the invention at this time; and they should be understood to cover the specified ranges and their equivalents.

As pointed out above, the invention is not for large quantities of chemicals, nor is it for very small amounts where the cost of packaging would excede the value of chemical saved. A practical minimum-size feeder is in the range of half a cubic inch to 1.5" diameter. For swimming pools of home size and for garden-hose systems, the maximum practical size is about four inches diameter or 35 cubic inches. Ball brickettes of solid chemicals are available of 3-inch diameter. Speculating that it may be practical to make brickettes larger if they are individually encapsulated, 70 cubic inches is seen as possibly practical for larger installations such as cooling towers, or for applying wash water detergent to automobiles and the like by hose.

A feeder 2¾ inches in diameter has been found to be satisfactory for most uses. This is in the middle of a volume range up to 24 cubic inches.

The preferred feed-hole size is about 0.026 for most uses; but for feeding some garden chemicals by garden hose as shown, a larger hole may be desired. Feed holes as small as 0.005 inches diameter and as large as three square millimeters are considered to fall within the invention. The aggregate area of feed holes will not excede 0.2% of shell area. Although one, or a few feed holes will usually suffice, twenty-five is selected as an upper limit, unless the number is multiplied by using a screen or mesh.

In every embodiment of the invention, the rate of chemical feeding is substantially reduced, or cut off completely when the system is not in use. This distinguishes the invention from the addition of chlorine from capsules that quietly float around in a swimming pool. Agitation or some intermediate velocity of flow stimulates the feeding. The invention is also to be distinguished from the above-mentioned patents to MacChesney and Friedrich where the chemical is interposed directly in a high-velocity stream, and wherein the capsule has no room to roll about to change its orientation.

Figure 8:
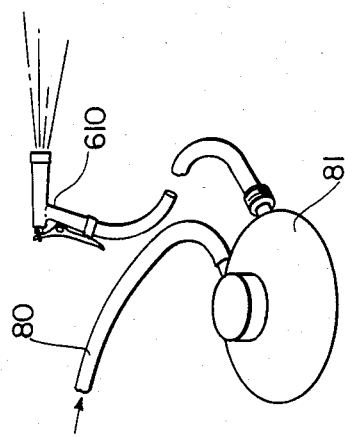
FIG. 8 is an arrangement of the invention with an alternative form of the intermediate-velocity chamber.

The concept of an "intermediate-velocity chamber" has been useful in describing the method of feeder operation. The term is generic to the skimmer basket, the pump strainer, or a chamber associated with a filter in the system of FIG. 1, the "fluidic" chamber of FIG. 7, or to the chamber 81 of FIG. 8, and to any other chamber which might be introduced for the purpose, which is large enough to accomodate the feeders without substantial blockage of the flow, and which never-the-less is small enough in cross-section so that the flow velocity is sufficient to cause the feeder to roll, or bob, or flutter with the flow. For definiteness the chamber size might be specified as bearing a relationship to the size of the feeder. In the foregoing examples the flow is a flow through the chamber and depends on the flow rate and the size of the chamber. But it is not the flow through the chamber that is important, but the flow impinging on the feeder.

It will be recognized that the foregoing embodiments are merely exemplary of the invention, and that modifications and extensions will be obvious which do not depart from the scope of the invention as defined by the following claims:

I claim:

1. Apparatus for adding chemicals in small amounts to water comprising:
   a. a supply of water at main pressure,
   b. an intermediate-velocity chamber,
   c. a water delivery device,
   d. a hose between said supply and said chamber,
   e. a conduit between said chamber and said device,
   f. a feeder in the form of a compact, stiff but flexible shell of waterproof plastic of substantially neutral bouyancy adapted to be contained within said chamber, and
   g. a dose of said chemical within said feeder, wherein:
      (i) said supply, hose, chamber, conduit, and device are interconnected to comprise a water-and-pressure-tight channel from said supply through said hose, chamber, conduit, and device, and
      (ii) said feeder is perforated by a number of small feed holes, selected to have a number, size, and distribution to provide a desired rate of feeding of said chemical, and is small enough and close enough to spherical in shape and to neutral bouyancy so that a normal flow rate through said chamber said feeder is free randomly to turn and move about, thereby to feed said chemical proportionately to said rate, wherein
      (iii) said device is a nozzle providing quick-acting control and cut-off of the flow of water through said channel,
      (iv) said feeder encloses trapped within it a bubble of gas, and
      (v) the amount of said entrapped gas, and the size of said feed holes is selected to control water hammering, and to provide a desired size shot of chemical to the target area of said nozzle with each cycle of said control, thereby providing a second mode of operation of the feeder.

2. Apparatus as defined by claim 1, wherein
   (vi) said chemical is of the group consisting of nutrients, fungicides, herbicides, insecticides, detergents, corrosion inhibitors, and wax solutions, and
   (vii) said bubble is enclosed in a thin plastic bladder.

3. Apparatus as defined by claim 1, wherein
   (vi) said chemical is of the group consisting of nutrients, fungicides, herbicides, insecticides, corrosion inhibitors, scale inhibitors, dispersants, defoamers, emulsifiers, flocculants, coagulants, and detergents.

4. Apparatus as defined by claim 1, wherein
   (vi) said chemical is of the group consisting of nutrients, fungicides, herbicides, insecticides, detergents, corrosion inhibitors, and wax solution.

5. Apparatus as defined by claim 1, wherein
   (vi) said feeder has a volume no more than 24 cubic inches and no less than 0.1 cubic inches, said holes are each less than three square millimeters in area, and greater than five thousandths of an inch (0.005") in diameter, and have an aggregate area less than 0.2% of the surface area of said shell.

6. Apparatus as defined by claim 1 wherein
   (vi) said feeder has a volume of between 24 cubic inches and 70 cubic inches, said holes are each less than three square millimeters in area, and greater than five thousandths of an inch (0.005") in diameter, and have an aggregate area less than 0.2% of the surface area of said shell.

7. Apparatus as defined by claim 6 wherein
   (vii) said chemical is of the group consisting of nutrients, fungicides, herbicides, insecticides, detergents, wax solution, and corrosion inhibitors.

8. Apparatus as defined by claim 7 wherein
   (viii) said chamber is a rounded pot with a removeable top for introduction of said feeder.

9. Apparatus as defined by claim 1 wherein
   (vi) said feeder is weighted and buoyed so that when placed in still water it reposes so that there is substantially no outflow of said chemical; and said bubble is of air which remains trapped at the top of said feeder.

10. Apparatus as defined by claim 7 wherein said bubble is enclosed in a thin plastic bladder and thereby trapped.

* * * * *